United States Patent
Liao

(10) Patent No.: US 6,808,138 B2
(45) Date of Patent: Oct. 26, 2004

(54) WIRE-WINDING BOX STRUCTURE WITH INCREASED USE AREA

(76) Inventor: Sheng Hsin Liao, No.10, Alley 38, Lane229, San Chun St., Shulin City, Taipei Hsien (TW)

( * ) Notice: Subject to any disclaimer, the term of this patent is extended or adjusted under 35 U.S.C. 154(b) by 6 days.

(21) Appl. No.: 10/336,731

(22) Filed: Jan. 6, 2003

(65) Prior Publication Data

US 2004/0129820 A1 Jul. 8, 2004

(51) Int. Cl.⁷ ............................................. B65H 75/48
(52) U.S. Cl. ............................... 242/378.1; 242/381.3; 242/385.3; 242/385.4
(58) Field of Search .......................... 242/378.1, 378.2, 242/378.3, 381.3, 385.3, 385.4

(56) References Cited

U.S. PATENT DOCUMENTS

| | | | | |
|---|---|---|---|---|
| 3,657,491 A | * | 4/1972 | Ryder et al. ............. | 242/378.2 |
| 4,417,703 A | * | 11/1983 | Weinhold ................ | 242/378.3 |
| 5,094,396 A | * | 3/1992 | Burke ..................... | 242/378.2 |
| 5,178,619 A | * | 1/1993 | Galazaka ................ | 242/378.1 |
| 5,544,836 A | * | 8/1996 | Pera ....................... | 242/378.1 |
| 6,439,490 B1 | * | 8/2002 | Hwang ................... | 242/378.1 |
| 6,474,585 B2 | * | 11/2002 | Liao ....................... | 242/378.1 |

* cited by examiner

Primary Examiner—Emmanuel Marcelo
(74) Attorney, Agent, or Firm—Browdy and Neimark, P.L.L.C.

(57) ABSTRACT

A wire-winding box structure with an increased use area has a wire-winding box body, a wire-winding disk, a communication wire and a power spring. One end of the communication wire is wound around a wire-winding pivot of the wire-winding disk to form an inner ring portion. The other end of the communication wire is wound in a receiving groove to form an outer ring portion. The communication wire, can thus be disposed around the wire-winding pivot and in the receiving groove at two faces of a first disk body of the wire-winding disk, respectively. The power spring is received in a spring receiving groove of the wire-winding disk. One fastening end of the power spring is fastened at the wire-winding disk, and the other fastening end thereof is fastened at the wire-winding box body.

16 Claims, 20 Drawing Sheets

WIRE-WINDING BOX STRUCTURE WITH INCREASED USE AREA

FIELD OF THE INVENTION

The present invention relates to a wire-winding box structure with an increased use area and, more particularly, to an improved wire-winding box structure, which has a communication wire capable of winding automatically to increase greatly the use area thereof so as to receive a longer communication wire.

BACKGROUND OF THE INVENTION

Appropriate communication wires need to be accommodated to achieve electrical connection when using communications apparatuses such as computers, modems, telephones, or facsimile apparatuses. To avoid entanglement of wire due to an excessive length of external wire or inconvenience of use due to an insufficient length of external wire, several kinds of wire-winding boxes applicable to various kinds of communications apparatuses have been proposed. Most of the wire-winding boxes comprise a wire-winding box body, a communication wire, a wire-winding disk, and a scroll spring so that the communication wire can be plugged into sockets of relevant communication apparatuses for communication of information.

A communication wire may be under tension due to resiliency of the scroll spring when it is pulled out from a conventional wire-winding box so that a proper length of the communication wire cannot be kept outside, resulting in trouble in use for a user. To resolve this problem, in some wire-winding boxes, a swing sheet capable of resiliently swinging is utilized, and gaps and locking grooves disposed at the periphery of a rotating disk are matched, thereby accomplishing winding or locating function.

In the above wire-winding box, however, the communication wire is wound around the wire-winding disk is limited in space by the wire-winding disk. Moreover, outer and inner ring portions of the communication wire disposed on the wire-winding disk need to be in proportional relation so that the outer ring portion of the communication wire disposed on the wire-winding disk is limited. Therefore, the use area of the wire-winding box is much limited, and the wire-winding box thus cannot receive a longer communication wire, hence limiting the usage of the wire-winding box.

Accordingly, the above conventional wire-winding boxes have inconvenience and drawbacks in practical use.

SUMMARY OF THE INVENTION

The primary object of the present invention is to provide a wire-winding box structure with an increased use area, wherein a communication wire is respectively disposed in a receiving groove and around a wire-winding pivot on two faces of a first disk body of a wire-winding disk. The communication wire is thus disposed at the receiving groove and the wire-winding pivot, which are staggered on the wire-winding disk. A power spring is received in the wire-winding disk so that the communication wire is less limited when wound around the wire-winding disk. Therefore, the use area of the wire-winding box increases greatly and thus is able to receive a communication wire of a longer length, hence facilitating the usage of the wire-winding box.

To achieve the above object, the present invention provides a wire-winding box structure with an increased use area. The wire-winding box structure comprises a wire-winding box body, a wire-winding disk, a communication wire and a power spring. The wire-winding box body has a receiving space therein. The wire-winding disk has a first disk body and a spring receiving groove. A receiving groove and a wire-winding pivot are disposed on two faces of the first disk body, respectively. The wire-winding disk is pivotally disposed in the receiving space of the wire-winding box body. One end of the communication wire is wound around the wire-winding pivot of the wire-winding disk to form an inner ring portion. The other end of the communication wire passes through the first disk body of the wire-winding disk and is then wound in the receiving groove to form an outer ring portion. The communication wire can thus be disposed around the wire-winding pivot and in the receiving groove in two faces of the first disk body of the wire-winding disk, respectively. The two ends of the communication wire also protrude from the wire-winding box body. The power spring is received in the spring receiving groove of the wire-winding disk. One fastening end of the power spring is fastened at the wire-winding disk, and the other fastening end thereof is fastened at the wire-winding box body.

The various objects and advantages of the present invention will be more readily understood from the following detailed description when read in conjunction with the appended drawings, in which:

DETAILED DESCRIPTION OF THE PREFERRED EMBODIMENTS

Figure 1:
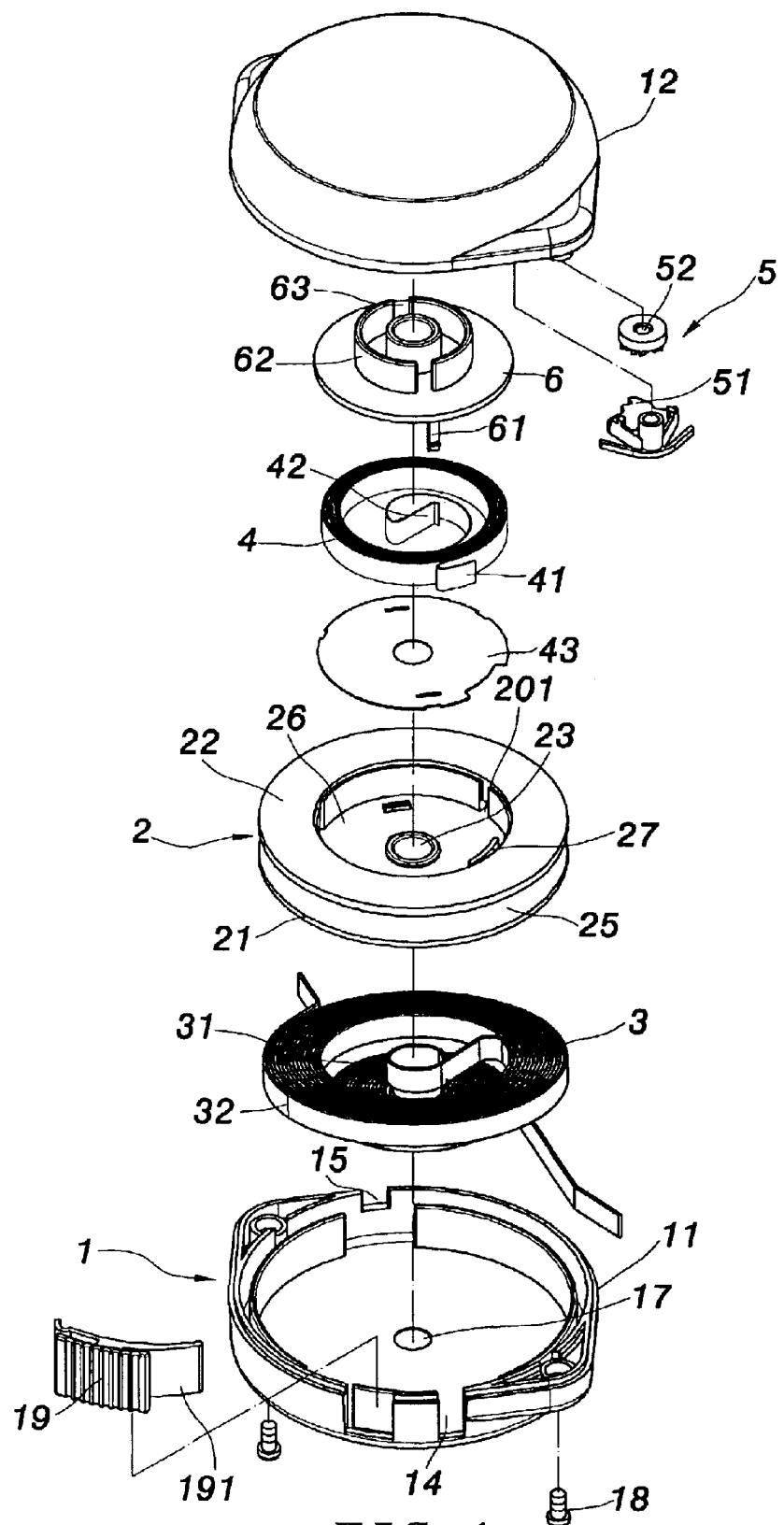
FIG. 1 is a schematic, exploded perspective view of a first embodiment of the present invention.
Figure 2:
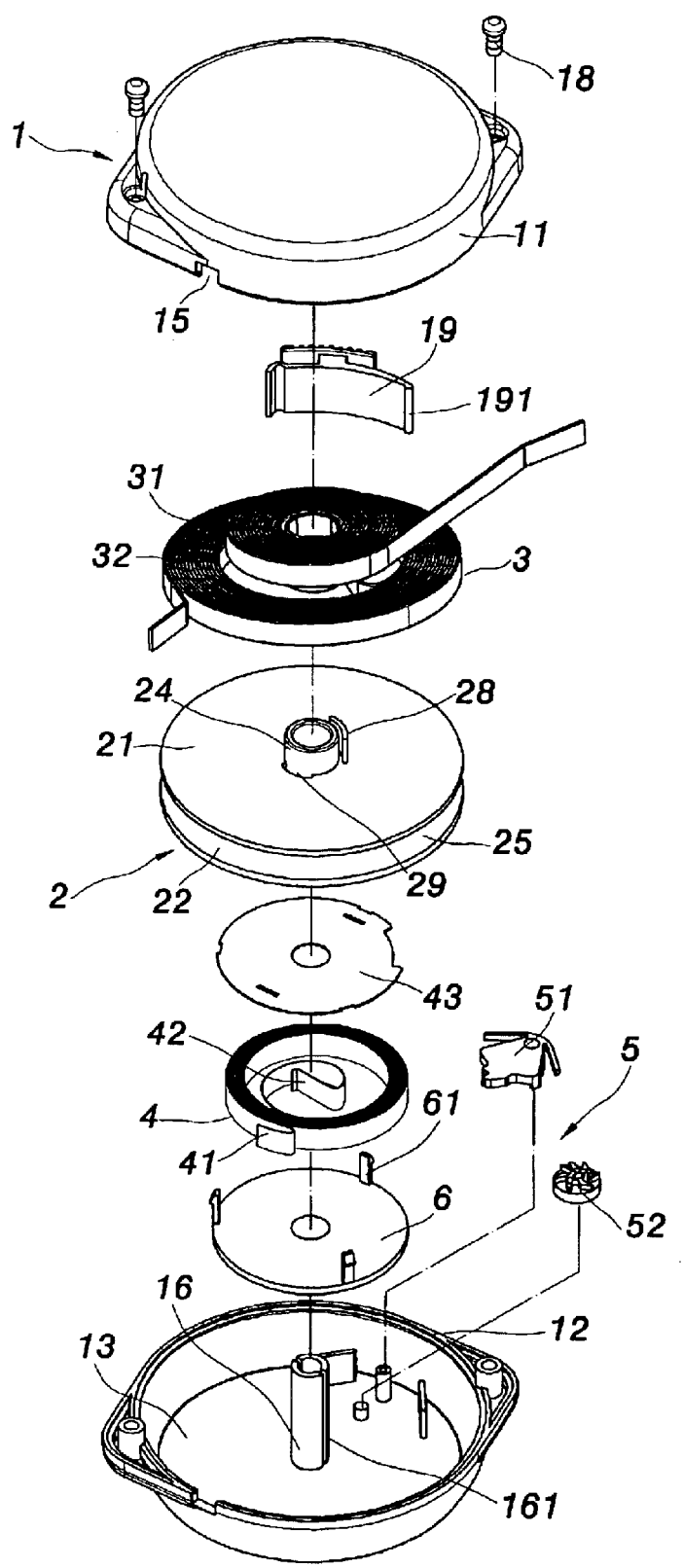
FIG. 2 is another schematic, exploded perspective view of the first embodiment of the present invention.

As shown in FIGS. 1–6, a wire-winding box structure with an increased use area according to a preferred embodiment of the present invention comprises a wire-winding box body 1, a wire-winding disk 2, a communication wire 3, and a power spring 4.

The wire-winding box body 1 is a hollow shell body formed by fastening or screwing a first half body 11 and a second half body 12 with screws 18. The wire-winding box body 1 has a depressed receiving space 13 therein to receive the communication wire 3, the wire-winding disk 2, and the power spring 4. A sidewall of the receiving space 13 has a first wire hole 14 for protrusion of one end of the communication wire 3 and a second wire hole 15 for protrusion of the other end of the communication wire 3. An inner side face of the receiving space 13 has a hollow projective shaft 16. A groove 17 for insertion and positioning of one end of the projective shaft 16 is disposed in the opposite side face of the receiving space 13.

The wire-winding disk 2 comprises a first disk body 21 and a second disk body 22. The first disk body 21 and the second disk body 22 are integrally formed or assembled together by fastening. A pivotal hole 23 is disposed on the two disk bodies 21 and 22. A hollow wire-winding pivot 24 and a receiving groove 25 are disposed on two faces of the first disk body 21, respectively. The receiving groove 25 is located between the two disk bodies 21 and 22. A positioning component 28 is disposed in the periphery of the bottom of the wire-winding pivot 24. The positioning component 28 is a circular arc plate having a cylindrical shape. A first through hole 29 is formed in the first disk body 21. The first through hole 29 penetrates through the two faces of the first disk body 21. A spring receiving groove 26 is disposed on the second disk body 22. A fastening plate 27 is disposed in the spring receiving groove 26. The wire-winding disk 2 is received in the receiving space 13 of the wire-winding box body 1. The wire-winding disk 2 is pivotally disposed on the projective shaft 16 through the pivotal hole 23 so that the wire-winding disk 2 can rotate in the receiving space 13.

Two ends of the communication wire 3 can connect devices (not shown) such as a plug or an earphone. The communication wire 3 is wound around the wire-winding pivot 24 of the wire-winding disk 2 to form an inner ring portion 31. The other end of the communication wire 3 passes through the through hole 29 in the first disk body 21 of the wire-winding disk 2, and is then wound in the receiving groove 25 to form an outer ring portion 32. Therefore, the communication wire 3 can be wound around the wire-winding pivot 24 and in the receiving groove 25 of the two faces of the first disk body 21 of the wire-winding disk 2, respectively. The communication wire 3 can also pass through between the positioning component 28 and the wire-winding pivot 24 to be clamped and positioned. The two ends of the communication wire 3 protrude from the first wire hole 14 and the second wire hole 15 of the wire-winding box body 1, respectively.

The power spring 4 is received in the spring receiving groove 26 of the wire-winding disk 2. One fastening end 41 of the power spring 4 is fastened at the fastening plate of the wire-winding disk 2 to connect the power spring 4 and the wire-winding disk 2. The other fastening end 42 of the power spring 4 is fastened in a preset cut trench 161 on the projective shaft 16 of the wire-winding box body 1 to connect the power spring 4 and the wire-winding box body 1. The power spring 4 is thus connected between the wire-winding box body 1 and the wire-winding disk 2 so that the power spring 4 can store dynamic energy when the wire-winding disk 2 rotates.

A separation sheet 43 is disposed below the power spring 4. The separation sheet 43 is located between the power spring 4 and disc body 21 to provide a support for spring 4. A cover plate 6 is disposed above the power spring 4. The cover plate 6 covers the top of the spring receiving groove 26 to close the spring receiving groove 26. A plurality of fastening hooks 61 is disposed upon and project from a face of the cover plate 6. A plurality of corresponding fastening holes 201 is disposed on the wire-winding disk 2. The fastening hooks 61 and the fastening holes 201 are fastened together to firmly connect the cover plate 6 and the wire-winding disk 2 together.

Figure 3:
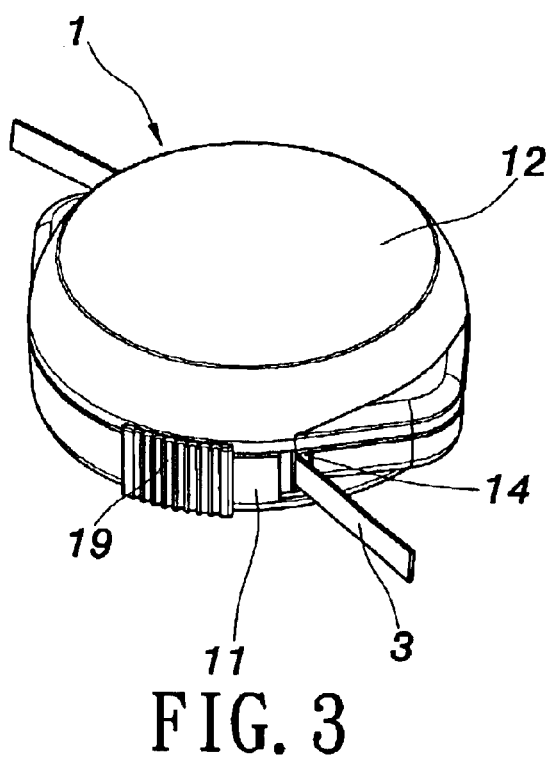
FIG. 3 is a schematic, perspective assembly view of the first embodiment of the present invention.
Figure 4:
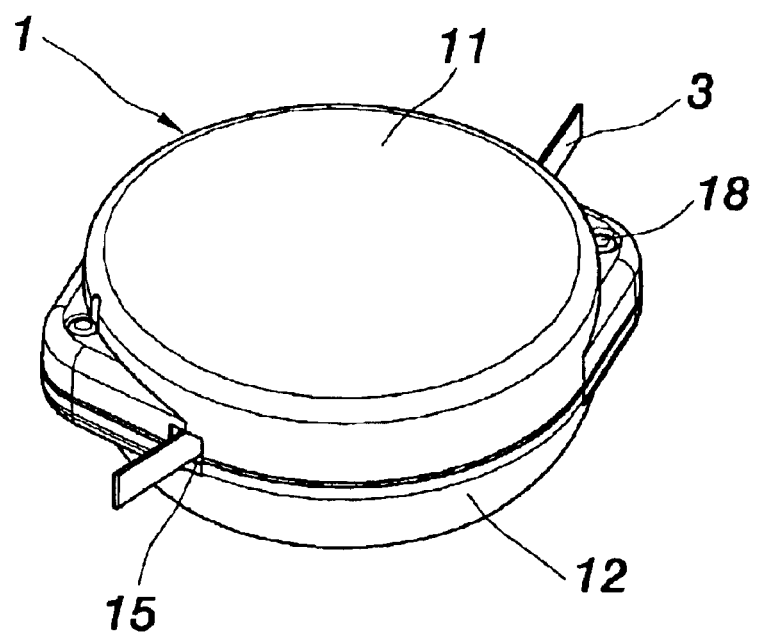
FIG. 4 is another schematic, perspective assembly view of the first embodiment of the present invention.
Figure 5:
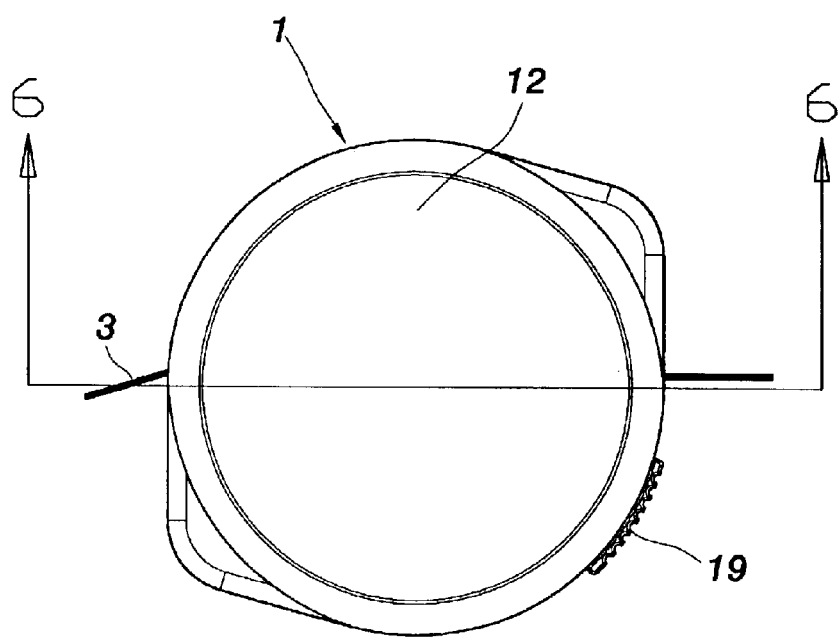
FIG. 5 is a schematic, top view of the first embodiment of the present invention.
Figure 6:
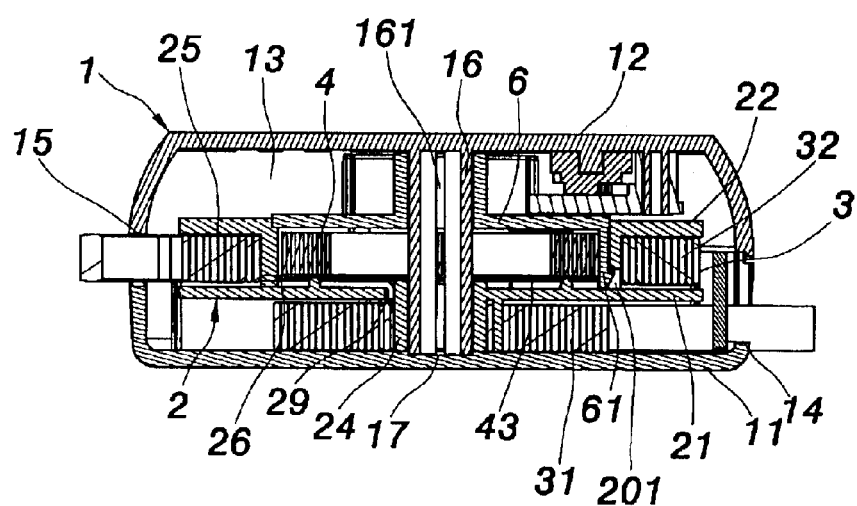
FIG. 6 is a schematic, cross-sectional view along line 6—6 in FIG. 5.

A wire-winding box as shown in FIGS. 3 and 4 is thus formed. In practical use, the wire-winding box can be utilized to receive a communication wire 3 of a considerable length, and the communication wire 3 can be wound back at any time. A user can insert a plug (not shown) connected to the communication wire 3 into a socket of a relevant communication apparatus for communication of information. The two ends of the communication wire 3 can be directly pulled out from the wire-winding box; and a certain restoring tensile force can be kept at the two ends of the communication wire 3 due to the action of the power spring 4 in the box. Therefore, the communication wire 3 can be successfully wound back into the box so that entanglement of the external wire can be avoided.

To prevent disturbance of the tensile force to a user when he or she pulls out the communication wire 3, a positioning seat 62 is disposed on and projects from the cover plate 6. A plurality of fastening grooves 63 is disposed on the positioning seat 62. A reciprocating control device 5 is disposed adjacent to the wire-winding disk 2. The reciprocating control device 5 comprises a swing sheet 51 capable of swinging freely and a ratchet 52 capable of rotating freely. The communication wire 3 can be fixed or wound back by repetitive pull and release actions through mutual relationships between the swing sheet 51, the ratchet 52, and the fastening grooves 63 of the cover plate.

Figure 7:
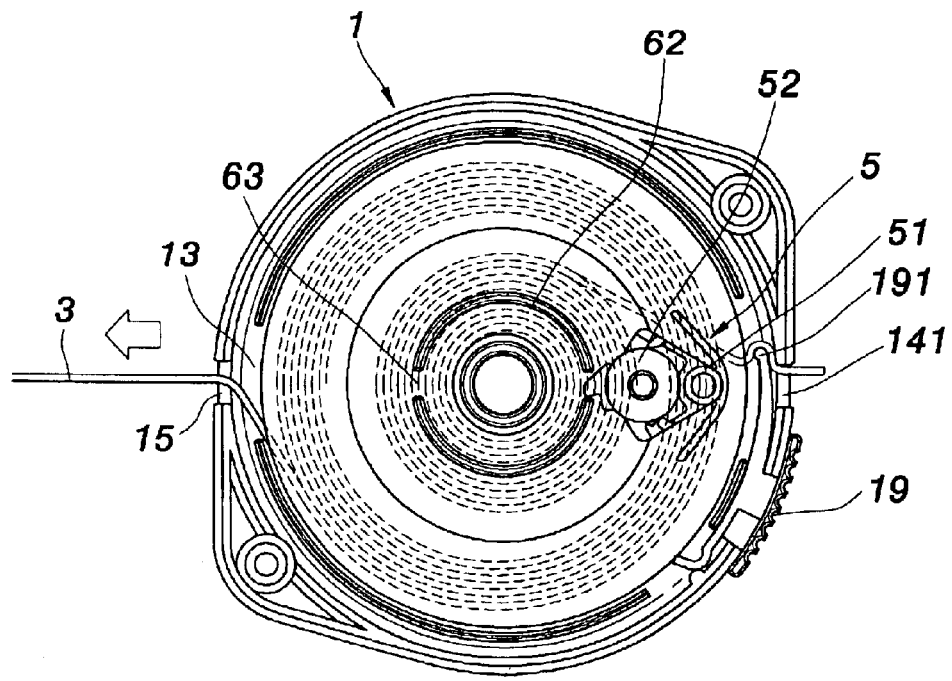
FIG. 7 is a schematic, action diagram of the first embodiment of the present invention.
Figure 8:
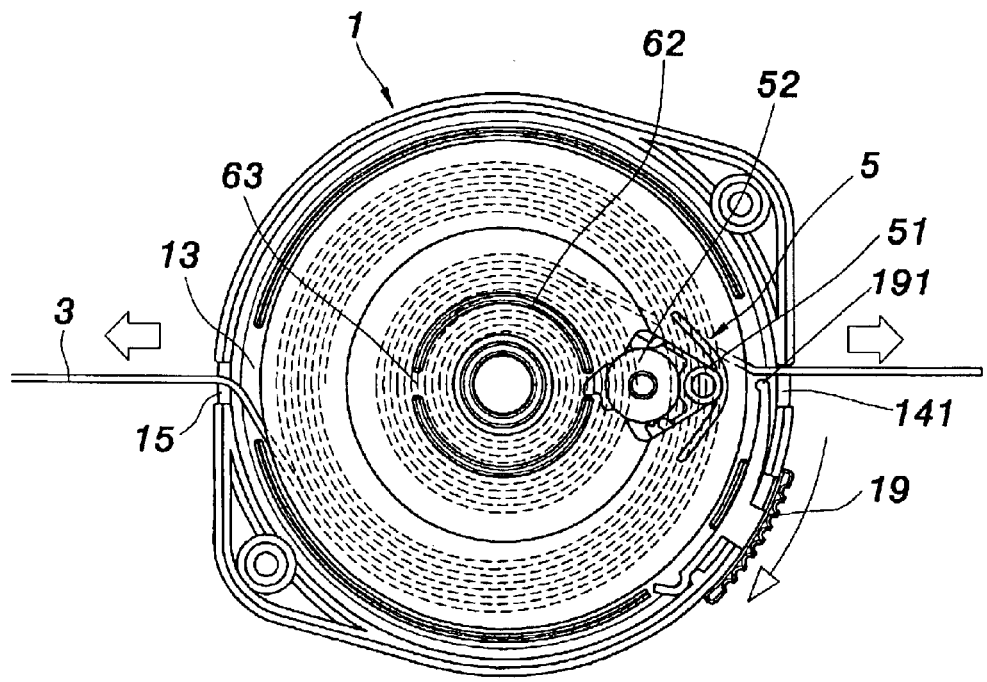
FIG. 8 is another schematic, action diagram of the first embodiment of the present invention.

A fastening button 19 can be disposed beside the first wire hole 14 at a side of the wire-winding box body 1. The fastening button 19 is slidably matched at a side of the wire-winding box body 1. One end of the fastening button 19 has a fastening portion 191. When the fastening button 19 is pushed toward the direction of the first wire hole 14, the fastening portion 191 abuts the communication wire 3 to accomplishing the function of fastening the communication wire 3 (as shown in FIG. 7). One end of the communication wire 3 is thus fastened, and only the other end of the communication wire 3 is movable. When the fastening button 19 is pushed in the reverse direction, the fastening portion 191 comes off the communication wire 3 to release the communication wire 3 (as shown in FIG. 8). The two ends of the communication wire 3 are thus movable. Besides, the fastening button 19 can also be fixedly matched at a side of the wire-winding box body 1 to let the fastening portion 191 of the fastening button 19 be able to fix and fasten the communication wire 3.

Figure 9:
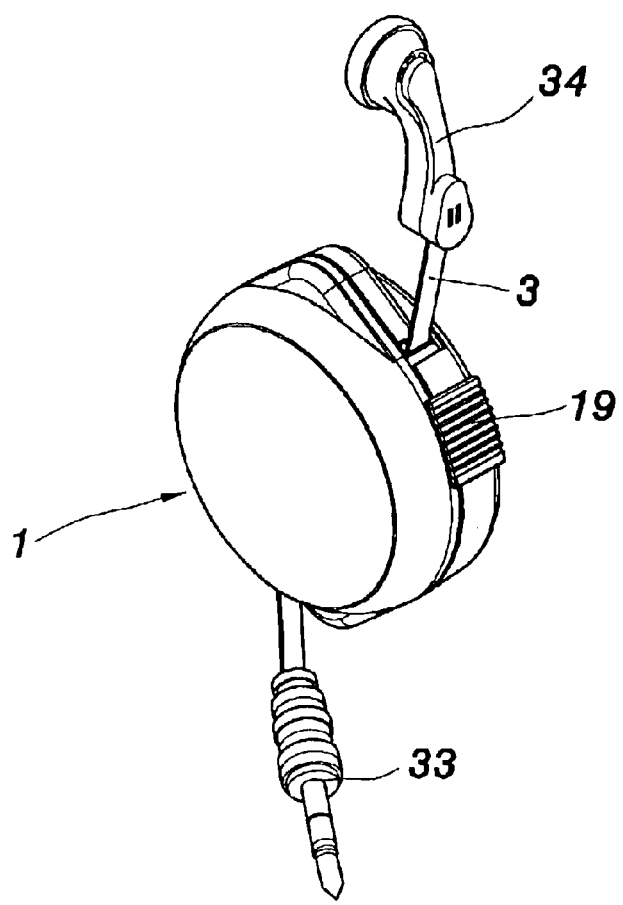
FIG. 9 is a schematic, perspective assembly view of a second embodiment of the present invention.
Figure 10:
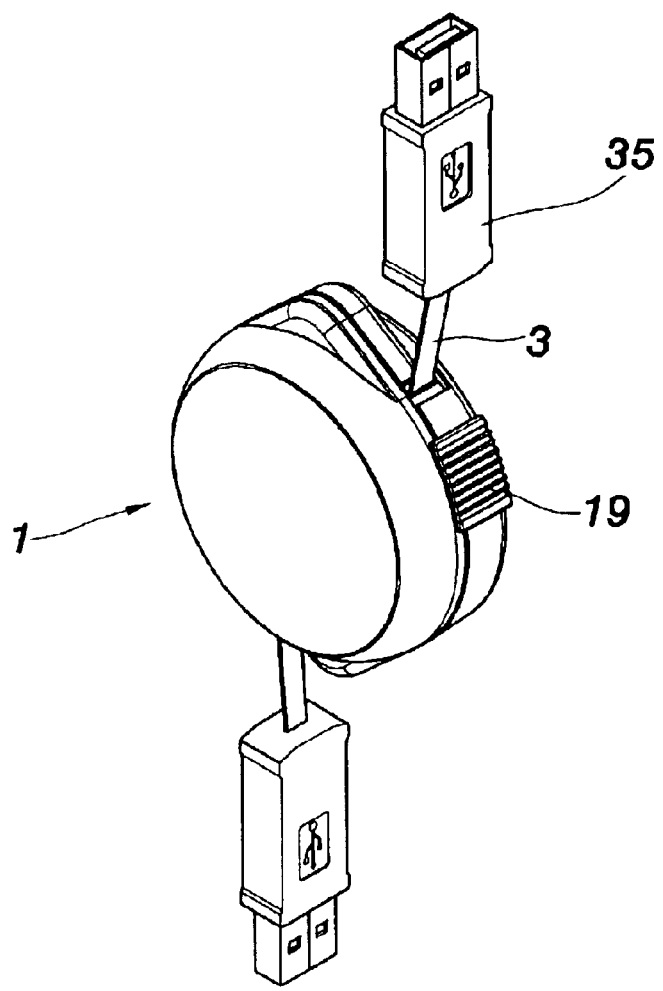
FIG. 10 is a schematic, perspective assembly view of a third embodiment of the present invention.
Figure 11:
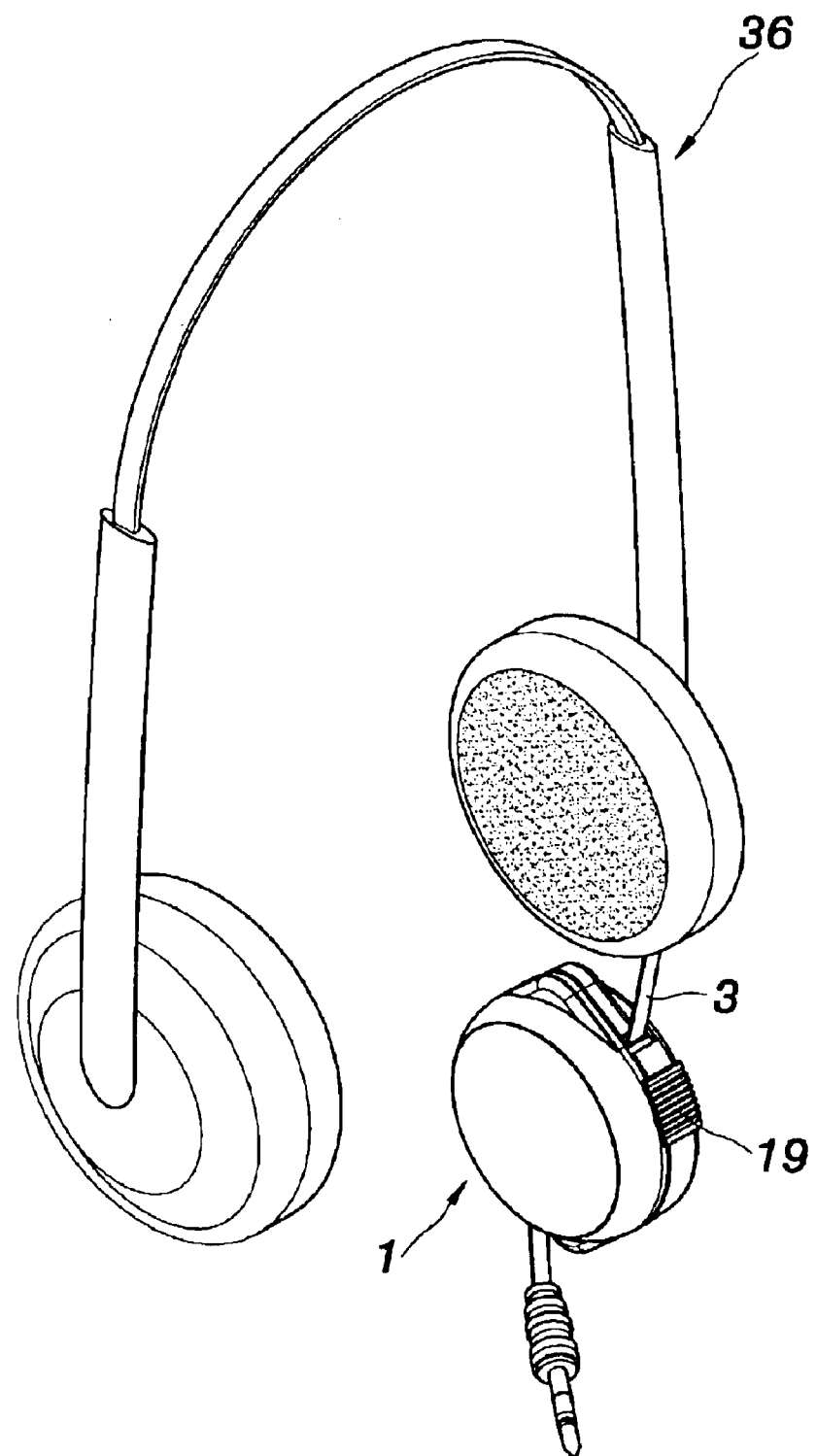
FIG. 11 is a schematic, perspective assembly view of a fourth embodiment of the present invention.

As shown in FIG. 9, the two ends of the communication wire 3 can connect a sound source plug 33 and an earphone 34, respectively. As shown in FIG. 10, the two ends of the communication wire 3 can connect two universal serial bus (USB) connectors 35, respectively. As shown in FIG. 11, one end of the communication wire 3 can connect a headphone 36.

Figure 12:
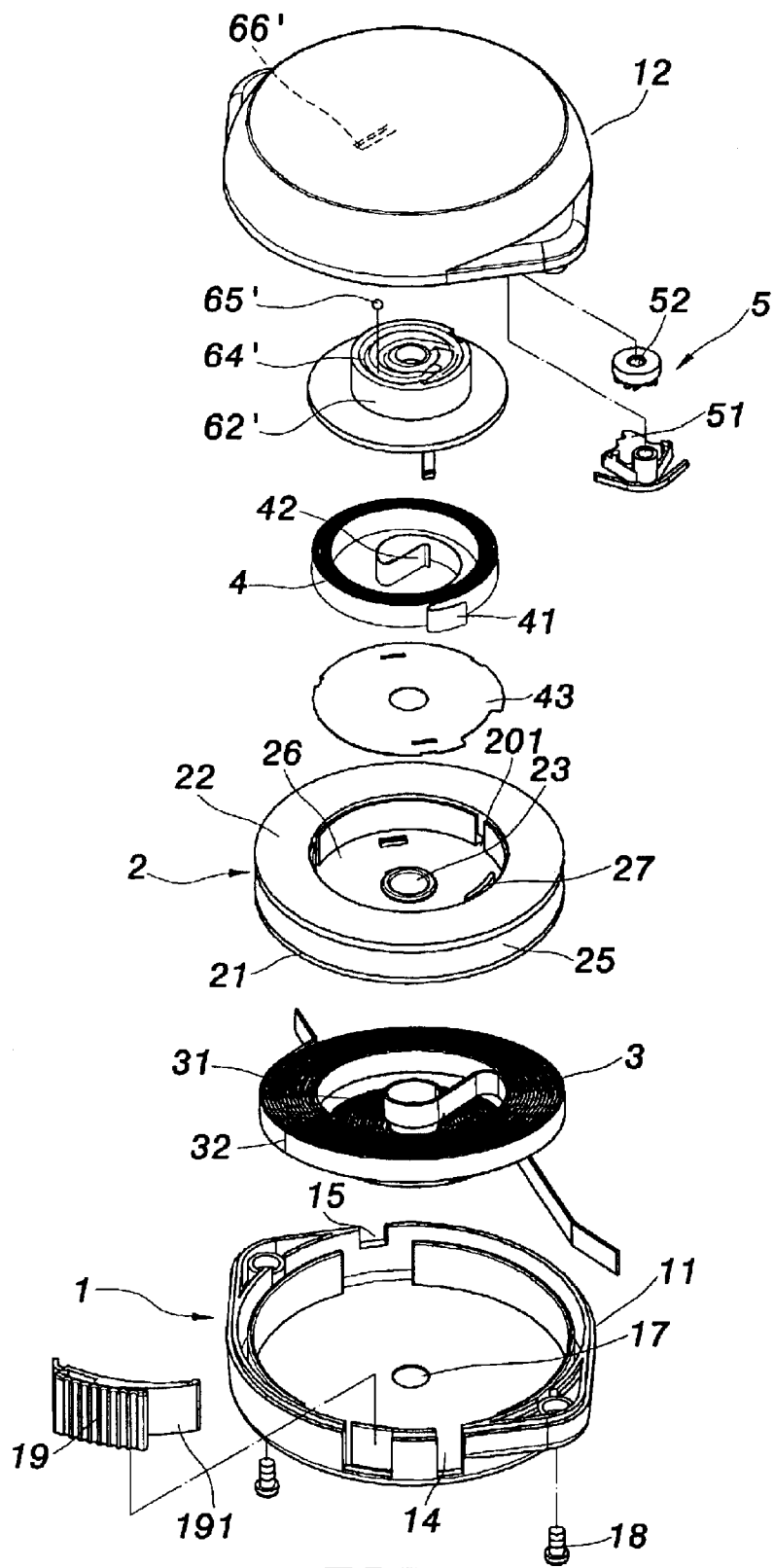
FIG. 12 is a schematic, exploded perspective view of a fifth embodiment of the present invention.

Additionally, as shown in FIG. 12, a track groove 64' can be disposed in a positioning seat 62'. A friction ball 65' is disposed in the track groove 64'. A limit groove 66' is disposed on an inner wall of the wire-winding box body 1. Part of the friction ball 65' is set in the limit groove 66' so that the friction ball 66' can only move in the limit groove 66'. The communication wire 3 can be fixed or wound back by repetitive pull and release actions through mutual relationships between the friction ball 65' and the track groove 64'.

Figure 13:
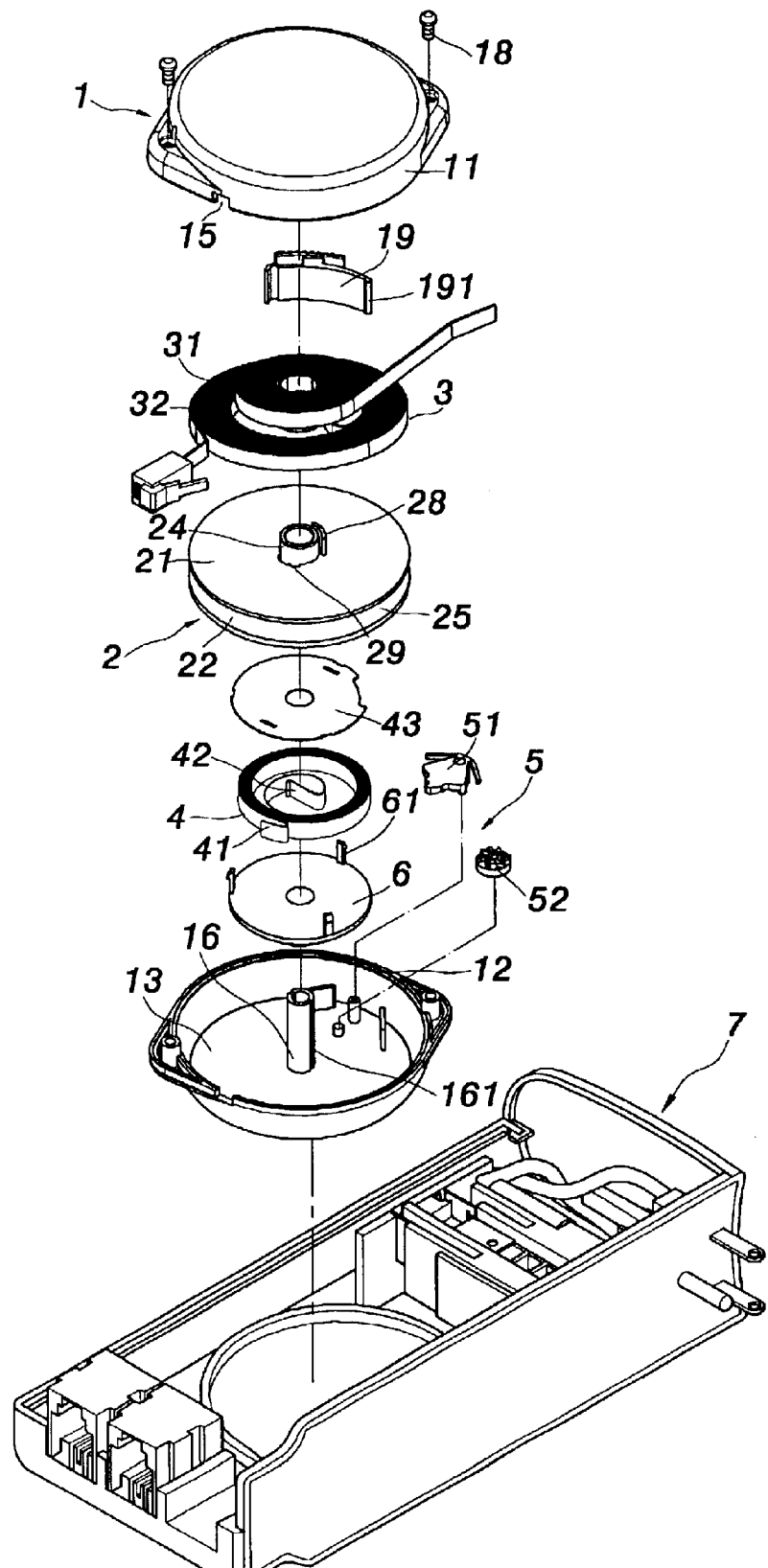
FIG. 13 is a schematic, exploded perspective view of a sixth embodiment of the present invention.
Figure 14:
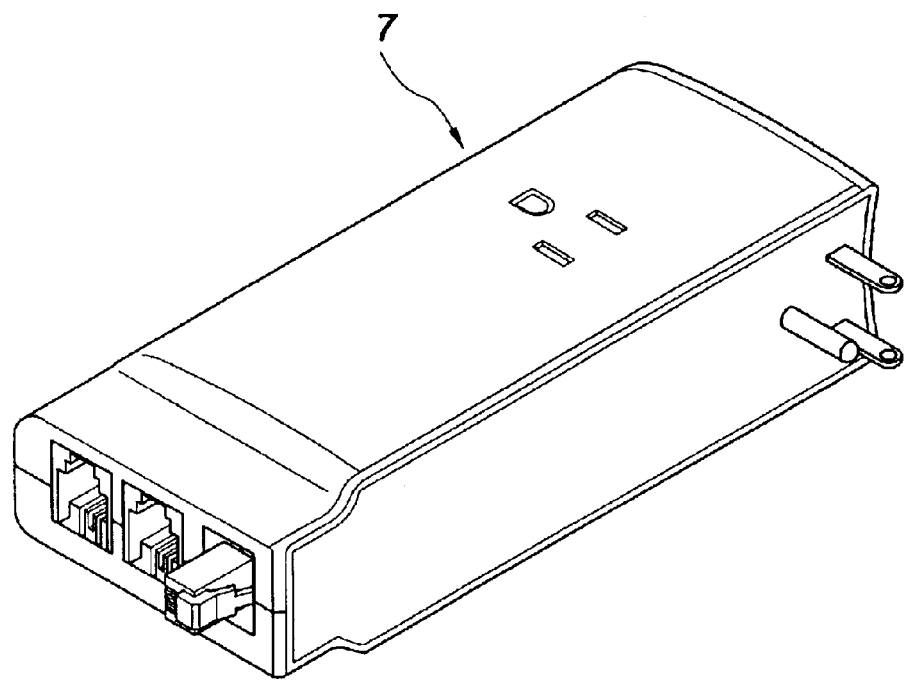
FIG. 14 is a schematic, perspective assembly view of the sixth embodiment of the present invention.
Figure 15:
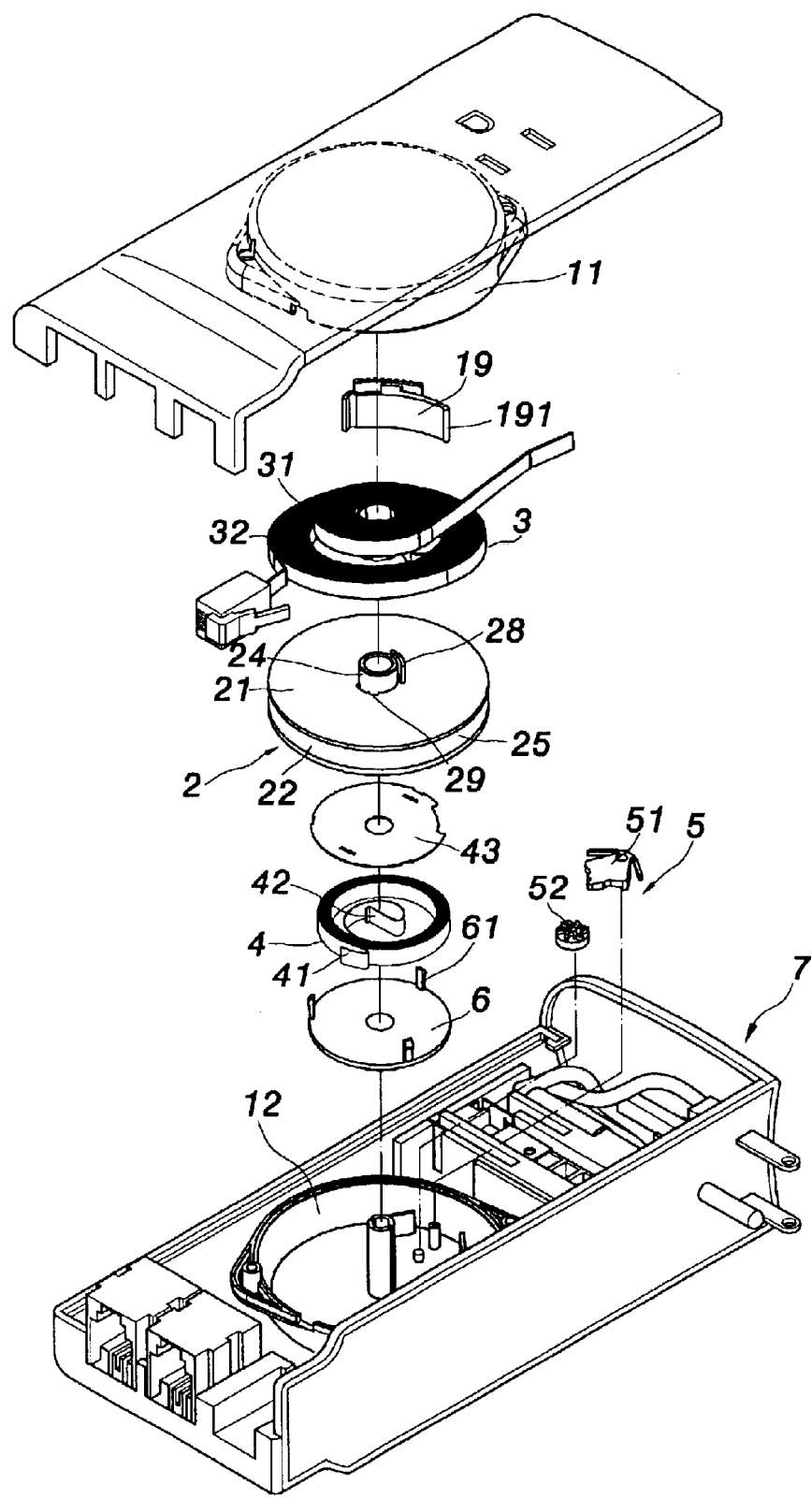
FIG. 15 is a schematic, exploded perspective view of a seventh embodiment of the present invention.
Figure 16:
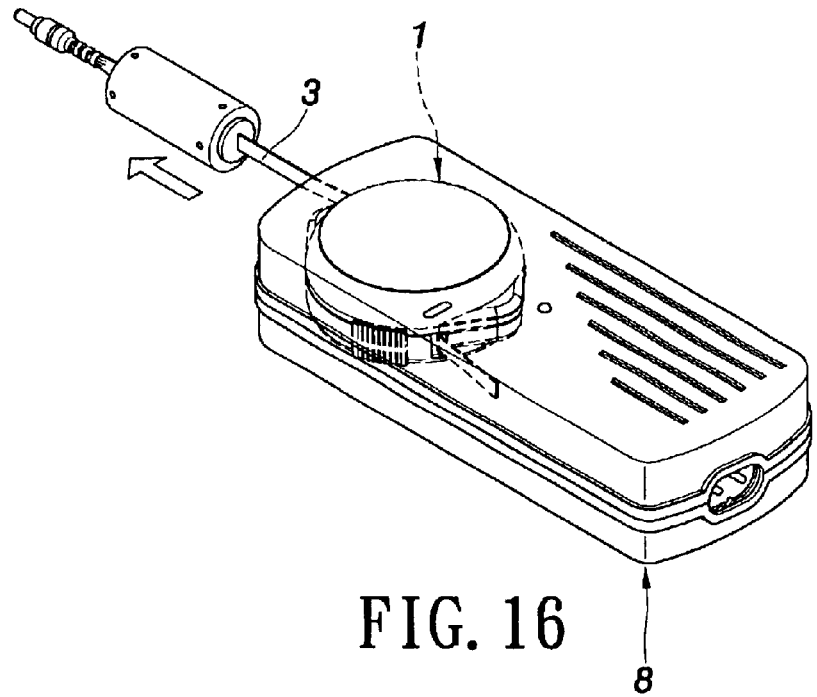
FIG. 16 is a schematic, perspective assembly view of an eighth embodiment of the present invention.
Figure 17:
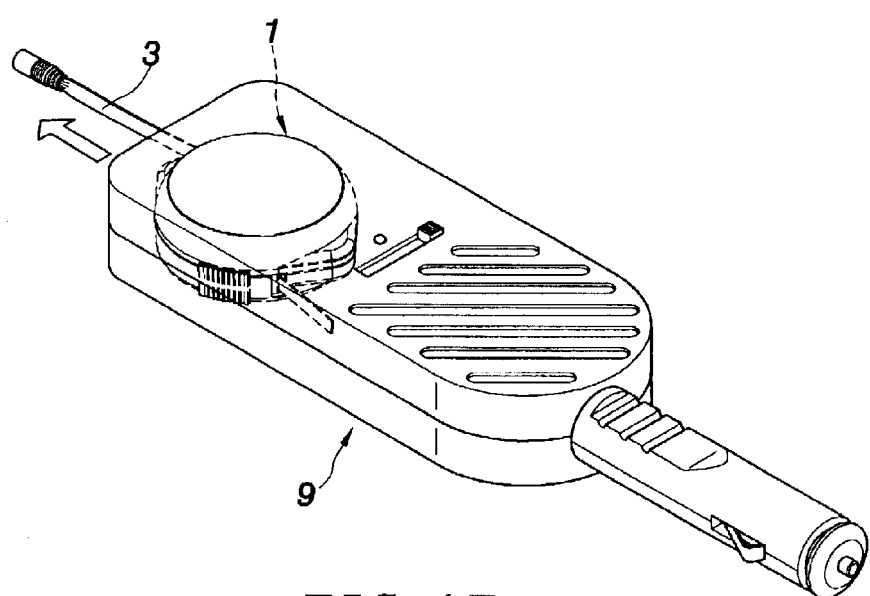
FIG. 17 is a schematic, perspective assembly view of a ninth embodiment of the present invention.
Figure 18:
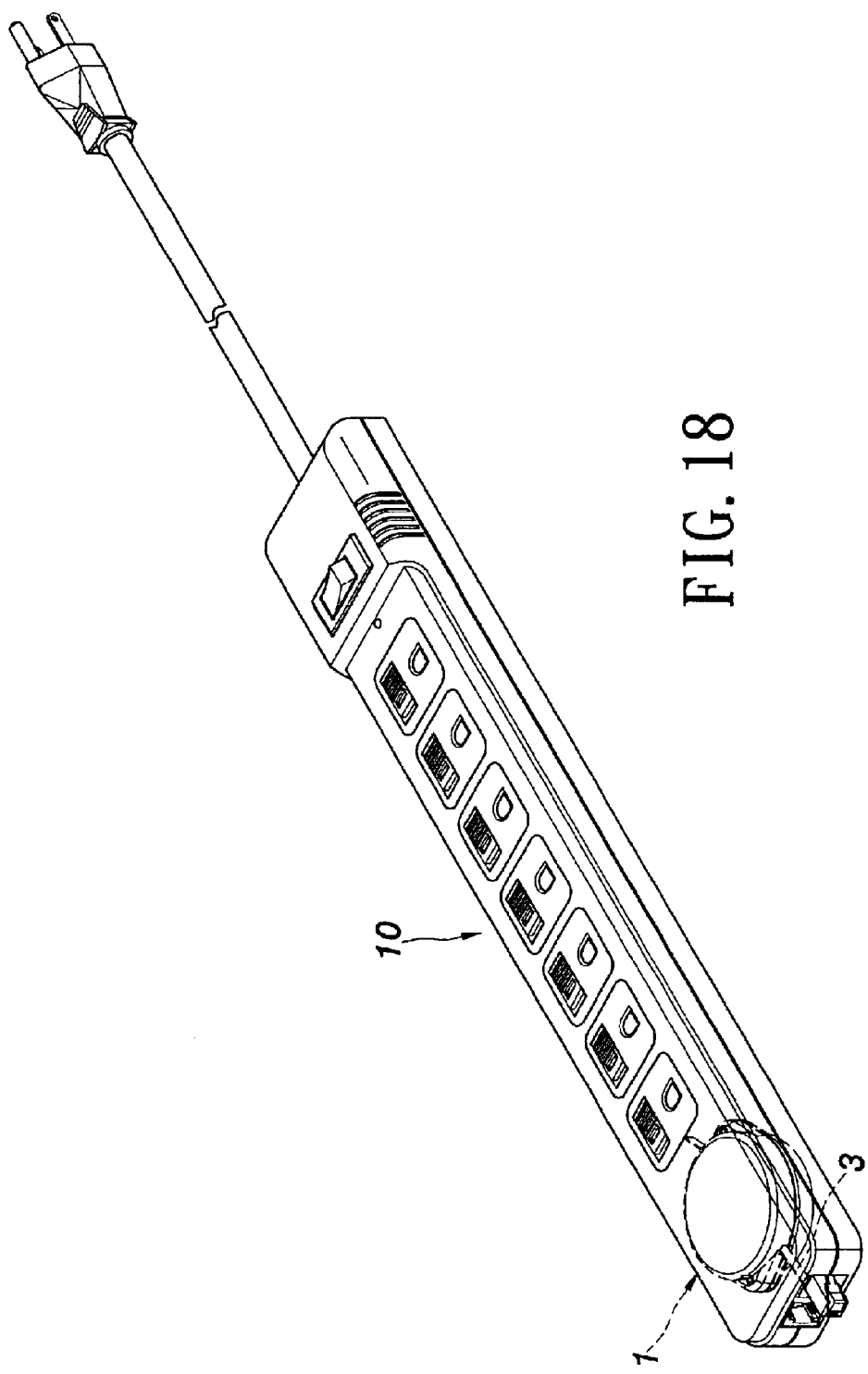
FIG. 18 is a schematic, perspective assembly view of a tenth embodiment of the present invention.
Figure 19:
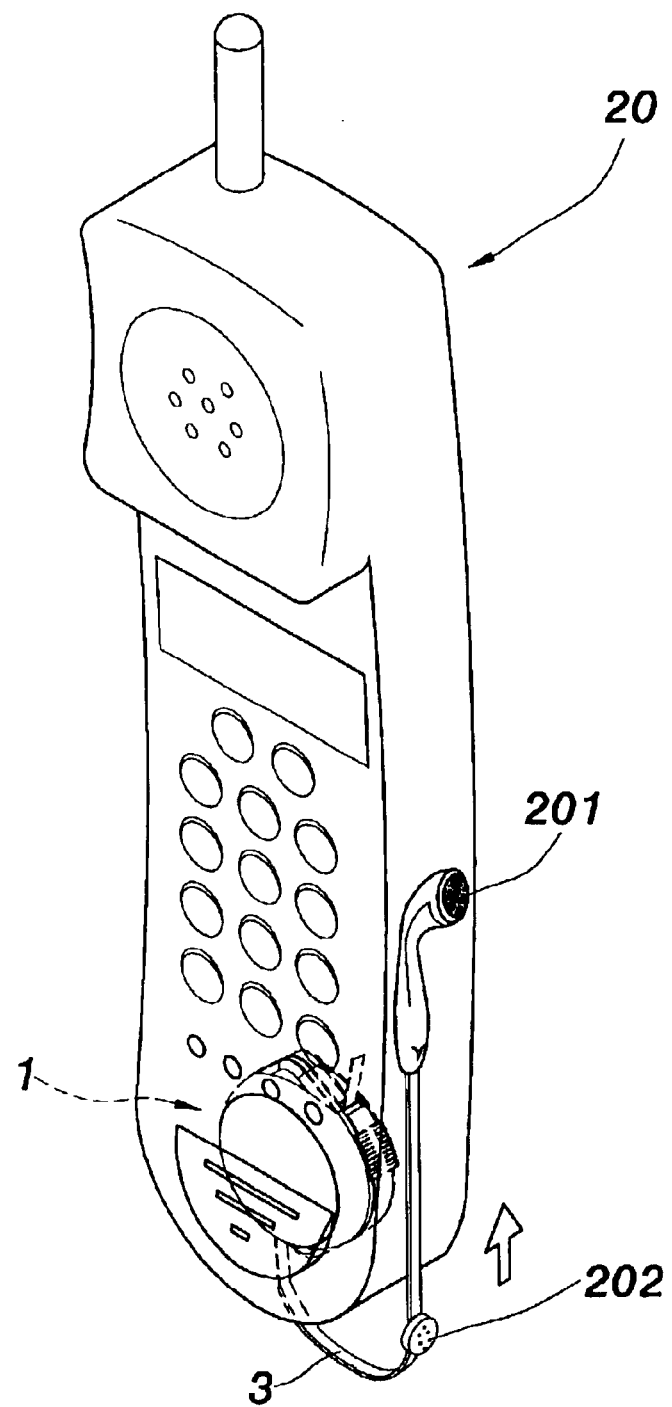
FIG. 19 is a schematic, perspective assembly view of an eleventh embodiment of the present invention.
Figure 20:
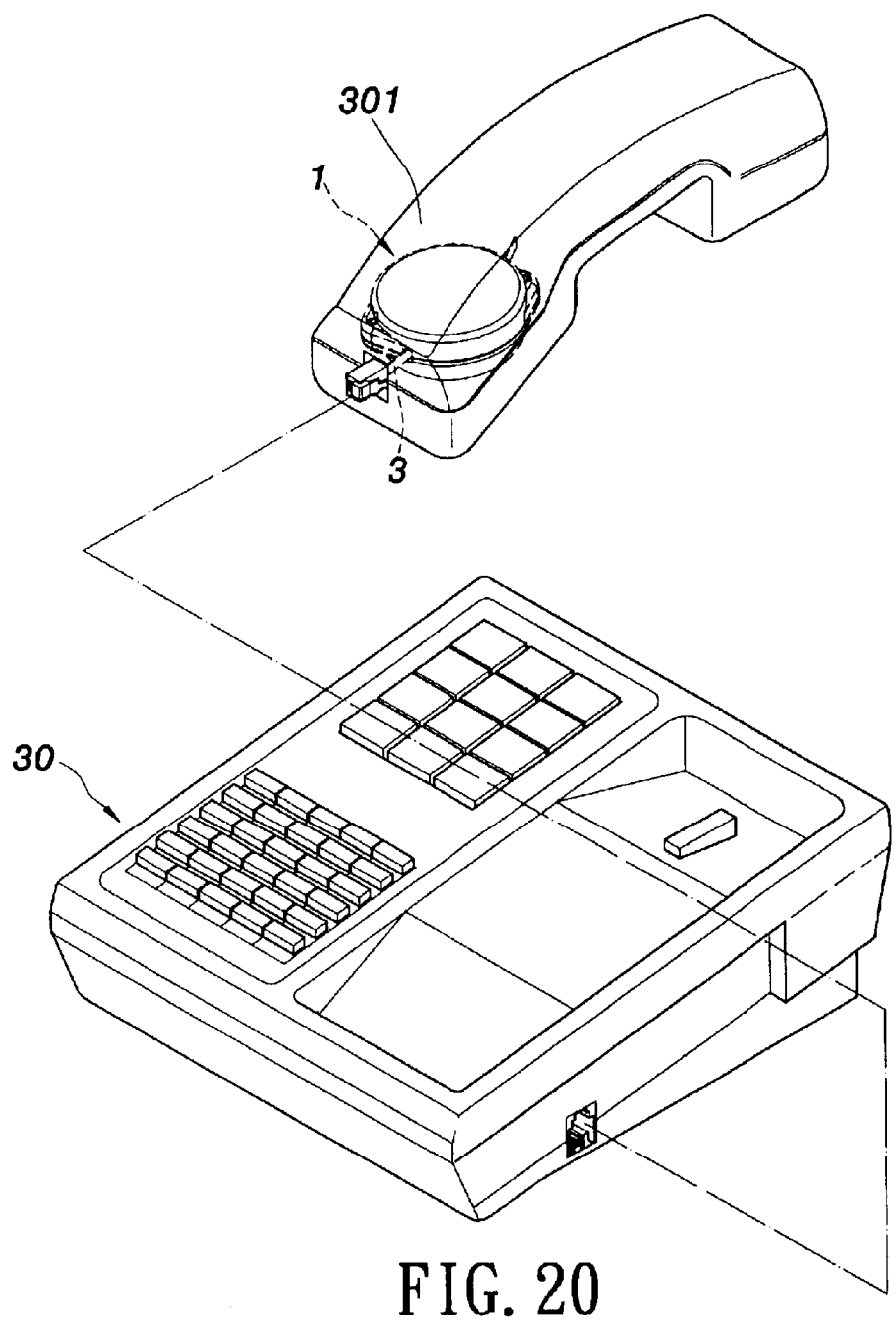
FIG. 20 is a schematic, perspective assembly view of a twelfth embodiment of the present invention.

As shown in FIGS. 13 and 14, the present invention can apply to a communications device 7. The first half body 11 and the second half body 12 of the wire-winding box body 1 can also be integrally formed with the communications device 7 (as shown in FIG. 15). Additionally, as shown in FIGS. 16–18, the present invention can apply to a switching transformer 8, a car charger 9, and an extension line socket 10. Moreover, as shown in FIG. 19, the present invention can apply to a wireless telephone 20 to facilitate the connection of the wireless telephone 20 to an external earphone 201 and a microphone 202. As shown in FIG. 20, the present invention can apply to a wired telephone 30 to facilitate the connection of the wired telephone 30 to a mouthpiece 301.

Figure 21:
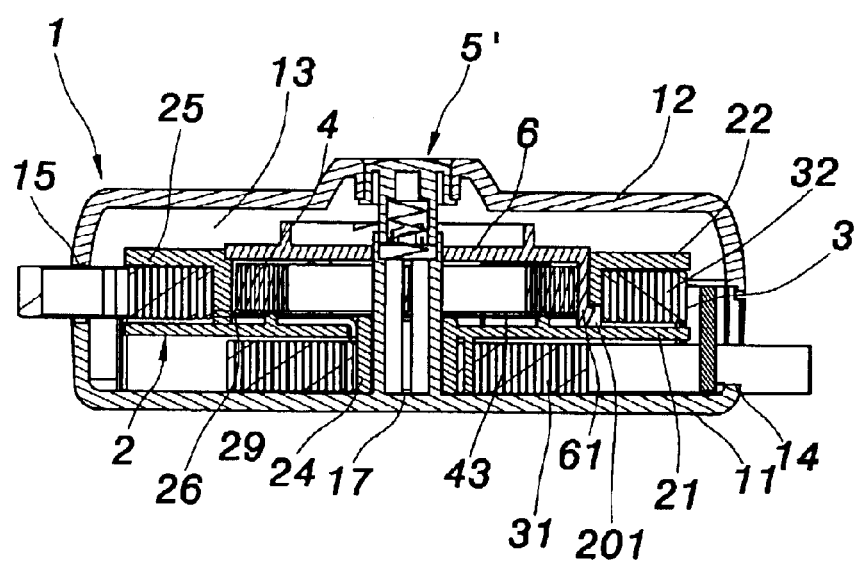
FIG. 21 is a schematic, cross-sectional view of a thirteenth embodiment of the present invention.

Further, as shown in FIG. 21, a keystroke type reciprocating control device 5' can be disposed on the wire-winding box body 1 so that the communication wire 3 can be fixed or wound back by means of pressing.

The present invention has the following characteristics and advantages.

1. The communication wire 3 is respectively wound in the receiving groove 25 and around the wire-winding pivot 24 on the two faces of the first disk body 21 of the wire-winding disk 2. The communication wire 3 is disposed in the receiving groove 25 and the wire-winding pivot 24, which are staggered on the wire-winding disk 2. When the communication wire 3 is wound around the wire-winding disk 2, the inner ring portion 31 and the outer ring portion 32 are staggered, and do not interfere with each other. The communication wire 3 is thus less limited in space by the wire-winding disk 2 when wound around the wire-winding disk 2. Therefore, the use area of the wire-winding box increases greatly to be able to receive a communication wire 3 of a longer length, hence facilitating the usage of the wire-winding box.

2. The power spring 4 is received in the spring receiving groove 26 of the wire-winding disk 2. The space occupied by the power spring 4 thus decreases, hence increasing the use area of the wire-winding box. Therefore, the wire-winding box can receive a communication wire 3 of a longer length.

To sum up, the present invention can greatly increase the use area of a wire-winding box to receive a longer communication wire, hence facilitating the usage of the wire-winding box.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A wire-winding box structure with an increased use area, the wire winding box structure adopted for an electronic device and comprising:

a wire-winding box body having two opposed sides, with a receiving space formed in said body between said opposed sides, a projective shaft extending from an inner center of one of said opposed sides, and a groove formed at the other of said opposed sides to accommodate and position the projective shaft in said receiving space, a wire-winding disk having a first disk body and a spring receiving groove, the first disk body including a receiving groove formed on a side thereof and a wire-winding pivot disposed on an opposite side thereof, said wire-winding disk being pivotally disposed in said receiving space of said wire-winding box body, wherein the wire-winding disk has a pivotal hole formed at a center thereof and sleeved with the projective shaft, so that the wire-winding disk is pivotally disposed in the receiving space of the wire-winding box body;

a communication wire including an inner ring portion wound around the wire-winding pivot of the wire-winding disk, an outer ring portion wound in the receiving groove by penetrating through the first disk body of the wire-winding disk and two ends extending and protruding from the wire-winding box body, wherein the outer ring portion and the inner ring portion each has various inner diameters; and a power spring received in said spring receiving groove of said wire-winding disk, wherein the projective shaft of the wire-winding box body has a cut trench formed thereon, the wire-winding disk includes a fastening plate disposed thereon, and the power spring has a fastening end secured with the fastening plate of the wire-winding disk and an opposite fastening end engaged with the cut trench of the projective shaft.

2. The wire-winding box structure with an increased use area as claimed in claim 1, wherein the wire-winding box body defines a first wire hole and a second wire hole, so that the two ends of the communication wire are capable of passing through the first and the second wire holes respectively.

3. The wire-winding box structure with an increased use area as claimed in claim 1, wherein the wire-winding box body includes a fastening button slidably or fixedly disposed on a side of sa d wire-winding box body, said fastening button having a fastening portion, to fasten one end of said communication wire.

4. The wire-winding box structure with an increased use area as claimed in claim 1, wherein the wire-winding disk has a second disk body mating with the first disk body, and said receiving groove is arranged between said first disk body and said second disk body.

5. The wire-winding box structure with an increased use area as claimed in claim 1, wherein said first disk body of said wire-winding disk has a through hole, penetrating therethrough, and said communication wire-winds around said wire-winding pivot in advance and passes through the through hole for receipt in said receiving groove.

6. The wire-winding box structure with an increased use area as claimed in claim 1, further including a separation sheet disposed under said power spring, and arranged between said power spring and said first disc body.

7. The wire-winding box structure with an increased use area as claimed in claim 1, further including a cover plate disposed above said power spring and engaged with the wire-winding disk to enclose said spring receiving groove.

8. The wire-winding box structure with an increased use area as claimed in claim 7, wherein the cover plate has a positioning seat disposed thereon, a fastening groove arranged in the positioning seat, and a reciprocating control device adjacent to the wire-winding disk, the reciprocating control device includes a swing sheet capable of swinging freely and a ratchet capable of rotating freely, and the communication wire is capable of immovability or wound receipt via a wind-and-release reciprocation between the swing sheet, the ratchet and the fastening grooves of the cover plate.

9. The wire-winding box structure with an increased use area as claim 7, wherein the cover plate has a positioning seat disposed thereon, a track groove formed on the positioning seat, and a friction ball movably accommodating with the track groove, the wire-winding box body has a limit groove for the friction ball partly mating therewith, and the communication wire is capable of immovability or wound receipt via a wind-and-release reciprocation between the friction ball and the track groove.

10. The wire-winding box structure with an increased use area as claimed in claim 1, wherein the wire-winding box body includes a keystroke-type reciprocating control device disposed thereon, so the communication wire is fixed or wound in a press manner.

11. The wire-winding box structure with an increased use area as claimed in claim 1, wherein the electronic device is a communication device for the wire-winding box structure disposed therein.

12. The wire-winding box structure with an increased use area as claimed in claim 1, wherein the electronic device is a switching transformer for the wire-winding box structure disposed therein.

13. The wire-winding box structure with an increased use area as claimed in claim 1, wherein the electronic device is a car charger for the wire-winding box structure disposed therein.

14. The wire-winding box structure with an increased use area as claimed in claim 1, wherein the electronic device is, an extension line socket for the wire-winding box structure disposed therein.

15. The wire-winding box structure with an increased use area as claimed in claim 1, wherein the electronic device is a wireless telephone for the wire-winding box structure disposed therein to connect an external earphone and a microphone of the wireless telephone.

16. The wire-winding box structure with an increased use area as claimed in claim 1, wherein the electronic device comprises a wired telephone and a mouthpiece for the wire-winding box structure disposed therein to connect said wired telephone with said mouthpiece.

\* \* \* \* \*